Jan. 27, 1942.    C. C. WILSON    2,271,469
SHELF SUPPORTING DEVICE
Filed May 31, 1939

Inventor:
Cary C. Wilson.
By Walter S. Jones Atty.

Patented Jan. 27, 1942

2,271,469

UNITED STATES PATENT OFFICE 2,271,469

SHELF SUPPORTING DEVICE

Cary C. Wilson, Bristol, R. I., assignor to United-Carr Fastener Corporation, Cambridge, Mass., a corporation of Massachusetts Application May 31, 1939, Serial No. 276,621

2 Claims. (Cl. 248—239)

The present invention relates to shelf supports, particularly to supports that are removably positioned in metallic structures, for example, refrigerators, metal book shelves and the like, and aims generally to improve existing supports for that purpose.

Referring to the drawing in which I have illustrated a preferred embodiment of my invention—

The broader features of the invention reside in the provision of a shelf support for a metallic body comprising an attaching element formed of a sheet metal stamping having a base and straight split fingers with inturned ends, extending through an aperture of the support, and a pin member having a knurled or roughened part of slightly larger diameter than the inner diameter between opposed fingers, whereby the fingers may be expanded by axial passage of the pin therebetween into gripping engagement with the walls of the support surrounding the aperture, accidental dislodgment of the pin being prevented by engagement of the fingers with the roughened part. The resilient fingers are advantageously straight, except for their inturned ends, and the pin member is provided with means for limiting movement of the pin axially in the attaching member and for holding the parts assembled.

Figure 1:
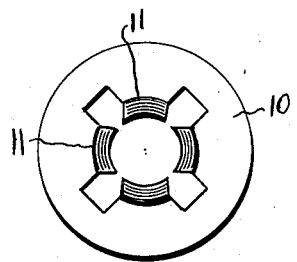
Fig. 1 is a plan view of an attaching member according to one form of the invention.
Figure 2:
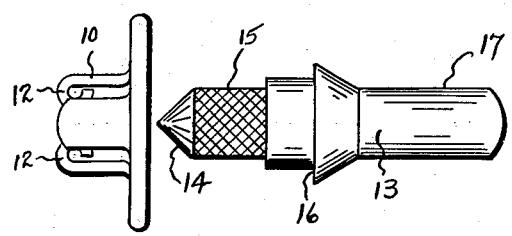
Fig. 2 is a side elevation of the cooperating members disassembled, according to the same form of invention.
Figure 3:
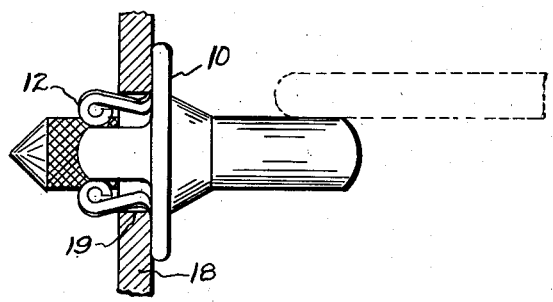
Fig. 3 is a sectional view of the members shown in Fig. 2 assembled, and secured in a supporting structure.

Referring more specifically to the forms of invention in Figs. 1, 2 and 3, the shelf support comprises an attaching member 10 having a plurality of spring fingers 11 extending from one side thereof formed with inwardly curled ends 12 and a finger-expanding and shelf-supporting pin 13. The pin 13 advantageously has a pointed end 14, a knurled or roughened finger-expanding portion 15, a shouldered stop 16, and a shelf-supporting part 17.

The attaching member 10 is advantageously formed from a single blank of metal stamped to provide a plurality of resilient fingers 11 arranged in a circumferential manner to present a pin-receiving bore. The free ends of the fingers 11 are curled inwardly or reversely bent so as to materially restrict the diameter at one end.

In use, the attaching member is applied to an apertured metal support 18, as for example, a refrigerator wall, by inserting the fingers 11 of the attaching member through the aperture 19 thereof. The pin 13 is then inserted in the bore of an attaching member, the pointed end 14 readily entering the restricted opening between the inturned ends 12 of the fingers 11. The knurled or roughened portion 15 of the pin is of larger diameter than the inturned diameter between the inturned finger ends 12, and expands them outwardly to grip the wall of the support 19 surrounding the aperture 18. The pin 13 is preferably formed with a stop portion 16 for limiting the movement of the pin in the bore of the attaching member, as well as to insure that the inturned ends 12 of fingers 11 are maintained in contact with the knurled or roughened portion 15 which acts to retain the pin in place against accidental displacement. The outer end 17 of the pin is of sufficient extent to provide a support for a shelf member S indicated in dotted lines, Fig. 3.

The invention is not to be restricted to the details of construction shown, which are intended purely as illustrative, but I intend to include, as well, equivalents as fall within the scope of the appended claims.

I claim:

1. A shelf support for attachment to an apertured metal supporting member comprising an attaching member having a base engaging one face of said supporting member, and a plurality of resilient fingers formed thereon extending through the aperture in the supporting member, the ends of said fingers beyond said supporting member being inturned presenting a restricted opening, a pin insertable through said attaching member having a shank portion of a size in excess of said restricted opening for expanding said finger ends into gripping engagement with portions of the supporting member surrounding the aperture therein, means for limiting movement of said pin inwardly through said attaching member, and a shelf-supporting member integral with said pin and located outwardly of said limiting means.

2. A shelf support for attachment to an apertured metal supporting member comprising an attaching member having a base engaging one face of said supporting member, and a plurality of resilient fingers formed thereon extending through the aperture in the supporting member, the ends of said fingers beyond said supporting member being inturned presenting a restricted opening, a pin insertable through said attaching member having a shank portion of a size in excess of said restricted opening for expanding said finger ends into gripping engagement with portions of the supporting member surrounding the aperture therein, a shoulder on said pin intermediate the length thereof for limiting movement of the pin inwardly through the attaching member, the portion of said pin outwardly of said shoulder constituting a shelf-supporting member.

CARY C. WILSON.